United States Patent [19]

Fontana et al.

[11] 4,254,077

[45] Mar. 3, 1981

[54] METHOD FOR MAKING DECORATIVE INLAID CONCRETE BLOCKS

[76] Inventors: John D. Fontana, 21 Pine Ridge Dr., Smithtown, N.Y. 11787; Louis R. Fontana, 150 S. Snedecor Ave., Bayport, N.Y. 11705

[21] Appl. No.: 73,629

[22] Filed: Sep. 10, 1979

Related U.S. Application Data

[63] Continuation-in-part of Ser. No. 920,478, Jun. 29, 1978, abandoned.

[51] Int. Cl.[3] .......... B29C 1/02

[52] U.S. Cl. .......... 264/225; 264/256

[58] Field of Search .......... 264/256, 220, 225

[56] References Cited

U.S. PATENT DOCUMENTS

| | | | |
|---|---|---|---|
| 1,137,595 | 4/1915 | Eyl | 264/247 |
| 3,515,779 | 6/1970 | Jones | 264/220 |
| 3,922,413 | 11/1975 | Reineman | 264/256 |

*Primary Examiner*—Donald E. Czaja

*Assistant Examiner*—James R. Hall

*Attorney, Agent, or Firm*—Posnack, Roberts, Cohen & Spiecens

[57] ABSTRACT

A method for making decorative concrete blocks which have inlays and which are especially suitable for use as floor or patio tiles. The method involves two steps in which concrete with two different degrees of wetness is employed. As an initial step, a first form, which is configured to define the desired inlaid pattern, is placed on a support. The form is filled with a first charge of concrete, which has the lesser of the two degrees of wetness and is preferably colored, to produce a pattern for the inlay. Thereafter, the concrete in the first form is compacted whereafter the form is removed without delay and the material is allowed to harden. In a further step, a second form, which is configured and dimensioned to surround the concrete inlay pattern, is placed on the support. A charge of concrete with a greater degree of wetness is then poured into the second form until it produces a layer which surrounds the concrete inlay pattern. The wet concrete is then allowed to set and harden sufficiently such that it is bonded to the concrete inlaid pattern formed by the first charge of concrete. To enhance the adherence between the concrete charges, the first charge is roughened by edge trowelling. Also, the first form is made with tapered elements to facilitate both compacting and subsequent withdrawal.

9 Claims, 15 Drawing Figures

METHOD FOR MAKING DECORATIVE INLAID CONCRETE BLOCKS

OTHER APPLICATIONS

This application is a continuation-in-part of our earlier filed application, Ser. No. 920,478, filed June 29, 1978.

FIELD OF THE INVENTION

The invention relates to processes for making decorative blocks with inlays and, more particularly, processes which are especially suitable for making decorative floor or patio tiles and the like.

BACKGROUND OF THE INVENTION

Techniques are known for making decorative tiles or concrete blocks with inlays. For example, in one particular known method, a multi-partitioned form composed of thin blades is placed within a box-shaped mold and the spaces between the partitions of the form are then filled with charges of differently colored wet concrete. After a substantial period of time, the multi-partitioned form is removed and the voids left thereby are filled by the sections of set concrete coming together to define an inlaid pattern in the tile.

While partially satisfactory, this known method has been found deficient in that it does not permit the making of thin uniform contrasting portions as, for example, where the effect sought is that of a narrow band of say one-half inch wide ribbon. So far as is known, no presently available technique has effectively dealt with this problem in a relatively simple and efficient manner as herein proposed.

U.S. Pat. No. 1,137,595 to E. C. Eyl illustrates another typical process improvements for which are provided by the present invention. In the E. C. Eyl Patent is disclosed a method for forming an ornamental block. This method comprises molding and hardening a plurality of concrete blocks of predetermined shape and color and grinding the surfaces and edges of each block so that the surfaces are smooth and the edges are sharp. The thusly ground blocks are placed in a desired pattern and the spaces between and around such blocks are filled with cement colored to a desired tint. A backing of cement is united to the foregoing product and the faces of the ground blocks are reground until the color and the sharp edges thereof are brought forth to the desired extent. As will be seen, this patent fails completely to utilize different charges of cement with different degrees of wetness and the patent moreover fails to suggest the method which achieves the advantages of economy and mass production afforded by the present invention as will be shown hereinafter.

SUMMARY OF THE INVENTION

It is an object of the invention to provide an improved process for making decorative concrete blocks with inlays.

It is another object of the invention to provide an improved process which is simple, reliable and economical to use.

It is a more particular object of the invention to provide an improved process having the foregoing attributes and characteristics which is especially suitable for making decorative floor or patio tiles.

Still another object of the invention is to provide an improved process which facilitates the use of manufacturing equipment thereby lending itself to greater production at lower cost while also resulting in the creation of products of greater strength.

The foregoing and other objects are attained with a method for making decorative concrete blocks which employs charges of concrete of different degrees of wetness. The method includes, for example, an initial step of placing a first form, which has at least one channel extending therethrough configured to define an inlaid pattern, on a support. Then, the channel of the first form is filled with a first charge of concrete which has a limited degree of wetness and is preferably colored. The charge is compacted so that it forms a relatively rigid concrete pattern of one or more inlays corresponding to the configuration of the first form.

Thereafter, the first form is removed without delay due to the limited degree of wetness and the compacting, and a second form, which is configured and dimensioned to encompass the concrete pattern previously formed, is placed on the support such that it surrounds the concrete pattern after the first charge has been allowed to harden. A second charge of concrete with a greater degree of wetness is then poured into the second form until it produces a layer which surrounds the concrete pattern. This second charge of concrete bonds itself to the concrete pattern and forms a relatively rigid, self-standing concrete block with an inlaid pattern. The second form can then be removed from the support.

As noted above, the first charge of concrete is preferably colored, by the addition of a coloring agent thereto, so that the inlaid pattern will distinctly contrast with the background surface provided by the second charge of relatively wet concrete. Alternatively, the second charge of concrete may be colored by the addition of a coloring agent or both charges of the concrete may be differently colored to provide a distinct contrast between the inlaid pattern surface and the background surface of the block.

More important, however, is the use of different degrees of wetness employed in the two concrete charges. Thus, for example, the second charge may have fifty or even one-hundred percent greater water inclusion than the first charge. This has a number of effects. Since the first charge may be allowed to cure in free standing form for twelve to twenty four hours or so before the second charge is applied with its attendant curing, the first charge may have a tendency to stick to its support to the extent that it will be destroyed on removal. The lesser water inclusion in the first charge prevents this high degree of sticking. The lesser water inclusion also permits the obtaining of darker coloring which tends to fade when more water is employed.

The use of different degrees of wetness further permits the first charge to be compacted to a self standing rigidity without waiting for curing thereby permitting forms to be used over and over without delay. It also facilitates roughing of the inlay pattern by edge trowelling. Still further it permits leaching of the second charge into the first charge to improve coupling between the two charges with the second charge supplying water to the first charge if necessary.

Advantageously, during filling of the second form, the second charge of wet concrete is poured into the form until it produces a layer which completely covers the concrete pattern. Most desirably, prior to this step the upper exposed surface of the first charge of wet concrete is roughened as aforesaid to promote bonding thereof to the second charge of wet concrete. This roughing supplements the utilization of a drier first charge.

In a preferred embodiment, the first form comprises a multi-partitioned form which has a plurality of channels extending therethrough so as to permit formation of a concrete inlay pattern which includes a plurality of spaced apart concrete segments. This multi-partitioned form advantageously includes a plurality of upstanding interconnected partitions which are downwardly tapered so as to permit formation of upwardly tapered concrete segments which define the inlay pattern. The second form also desirably comprises a generally square-shaped hollow frame so as to permit formation of a rectangular inlaid concrete block.

In a particularly preferred embodiment, following both the steps of removing the first and second forms from the support, the support is placed on a drying rack to permit complete hardening of the first and second charges of concrete.

The above description, as well as further objects, features and advantages of the present invention, will be more fully appreciated by reference to the following detailed description of a preferred embodiment of the invention, taken in conjunction with the accompanying drawing.

DETAILED DESCRIPTION

Figure 1:
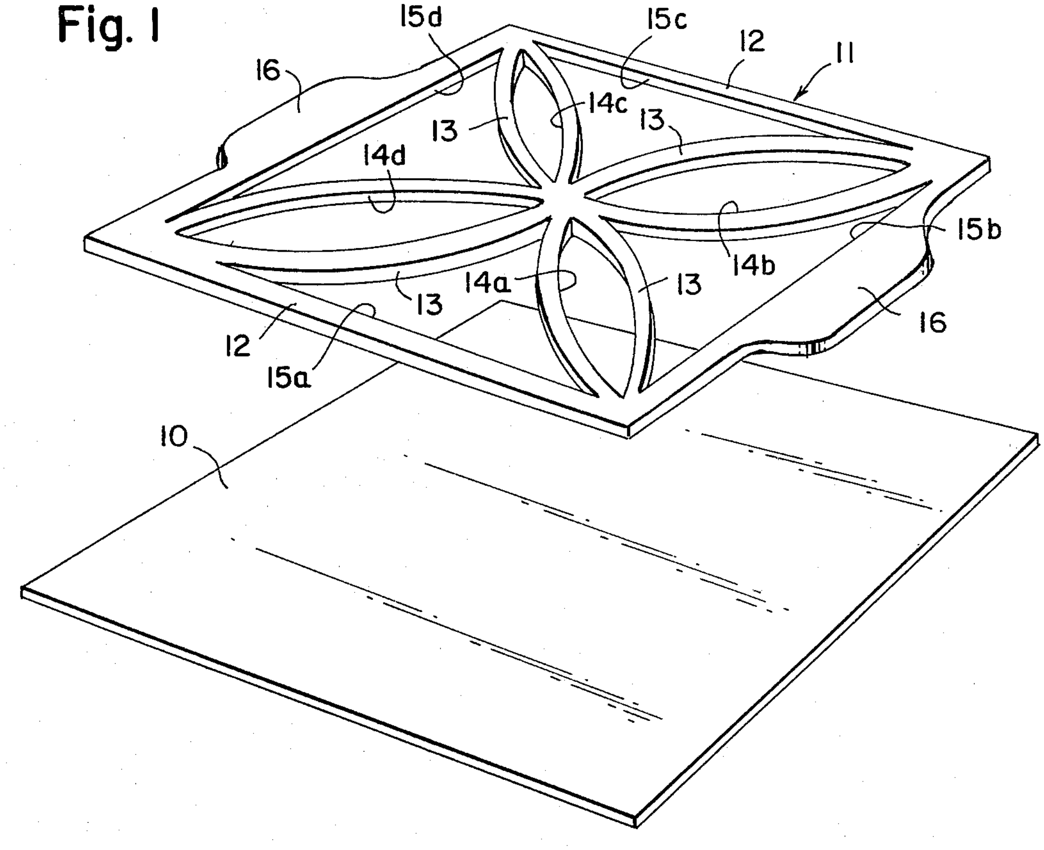
FIG. 1 is a perspective view of a partitioned form and a planar support which are used in carrying out the process of the invention.

In the drawing is illustrated the apparatus and sequence of steps used in carrying out a process for making decorative concrete blocks with inlays according to the invention. More particularly, as shown in FIG. 1, a rectangular planar support or plate 10 is provided which serves as a work table or surface on which the concrete blocks are formed.

A partitioned first form 11 is employed which is configured to permit formation of a desired inlay pattern. Form 11 includes a generally square-shaped outer frame or border 12, and four illustrative elliptically-shaped inner segments 13, the outer ends of which merge with respective of the corners of frame 11 and the inner ends of which merge together at the center of the frame 11. Form 11 defines four generally elliptical recesses or chambers 14*a*, 14*b*, 14*c* and 14*d* disposed generally along the diagonals of frame 12, and four generally triangular recesses or chambers 15*a*, 15*b*, 15*c* and 15*d* disposed therebetween, which together define the desired inlay pattern. Other desired inlay patterns may be employed.

As will be discussed hereinafter, the method of the invention employs two charges of concrete, one for the inlay or inlays and one for the background or body. The latter charge has a greater degree of wetness and is mixed with substantially more water than the first. For example, the latter or second charge has fifty to one hundred percent or more water included than the first charge. This is illustrated by the following examples:

EXAMPLE 1

| | ⅛" Gravel | Medusa White Portland | Water |
|---|---|---|---|
| First charge (inlay sections) | 7 cu. ft. | 1 bag (94 lbs) | 2 gal. (±) 8 fl. oz. |
| Second charge (background) | 7 cu. ft. | 1 bag (94 lbs) | 4 gal. (±) 8 fl. oz. |

EXAMPLE II

| | Fine Washed Sand (¼" × ⅛" screen) | Medusa White Portland | Water |
|---|---|---|---|
| First charge (inlay sections) | 7 cu. ft. | 1 bag (94 lbs) | 4 gal. (±) 8 fl. oz. |
| Second charge (background) | 7 cu. ft. | 1 bag (94 lbs) | 6 gal. (±) 8 fl. oz. |

Figure 1A:
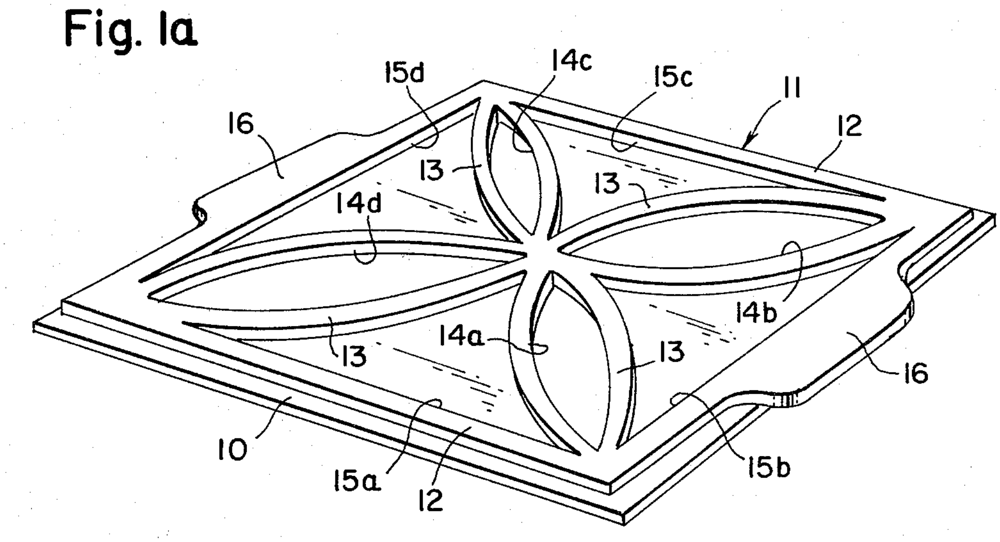
FIG. 1*a* is a perspective view comparable to FIG. 1 but showing the partitioned form placed atop a planar support in an initial step of the process.
Figure 2:
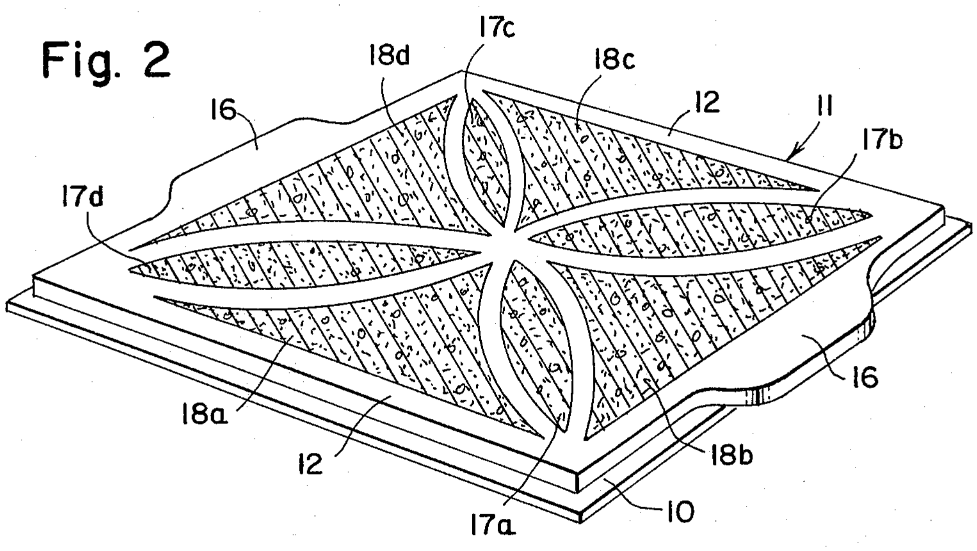
FIG. 2 is a perspective view similar to that of FIG. 1*a*, but showing the compartments of the form filled with a first charge of wet concrete in a further step of the process.

As shown in FIG. 1*a*, the initial step of the process simply requires the placing of form 11 on support 10, which is facilitated by the provision of two handles 16 on form 11. Then, as shown in FIG. 2, recesses 14*a*, 14*b*, 14*c*, 14*d* and 15*a*, 15*b*, 15*c*, 15*d* are completely filled with a first charge of relatively dry concrete, which is preferably colored, so as to form four elliptically-shaped concrete tile segments 17*a*, 17*b*, 17*c* and 17*d* and four generally triangularly-shaped concrete tile segments 18*a*, 18*b*, 18*c* and 18*d*. Despite the fact that the first charge of concrete has a reduced water content, the charge of relatively dry concrete is nevertheless made wet enough so that the segments will stick sufficiently to support 10 to avoid displacement thereon. This insures that they will stay in their proper position and will not move during the application of the second charge of wetter concrete, as will be discussed in greater detail hereinafter. On the other hand, the first charge is made sufficiently dry that it can be made generally rigid and self supporting by compacting and so that no portions thereof will stick to support 10 on removal of the overall assembly therefrom. Thereby, without waiting for curing, the form 11 can be removed and reused, thus facilitating manufacture by speeding up the first half of the process and allowing multiple use of the inlay forms.

Figure 3:
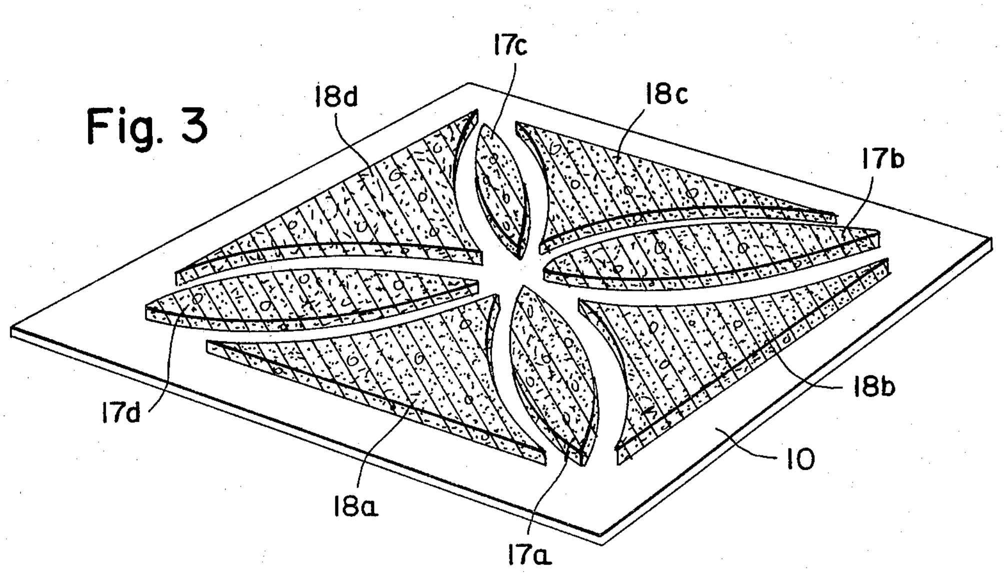
FIG. 3 is a perspective view comparable to that of FIG. 2 but with the partitioned form removed following compacting of the concrete in the desired inlay pattern in a further step of the process.

More particularly, as shown in FIG. 3, once the eight colored concrete segments 17*a*, 17*b*, 17*c*, 17*d* and 18*a*, 18*b*, 18*c* and 18*d* have been stiffened sufficiently by compacting such that they adhere to support 10, without breaking or moving out of place, form 11 is removed.

This compacting is effected by employing an excess of from five to twenty percent by volume extra of the concrete and forcing the extra into the form as is permitted by minimizing the use of water. Compacting is effected by the use of a trowel to be discussed hereinafter. This trowel is also used for roughing.

Figure 4:
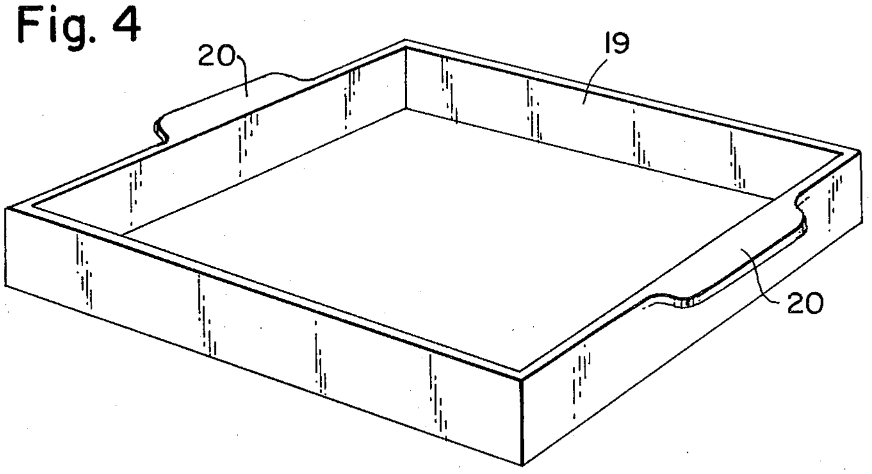
FIG. 4 is a perspective view of a square-shaped second form also used in carrying out the process of the invention.
Figure 5:
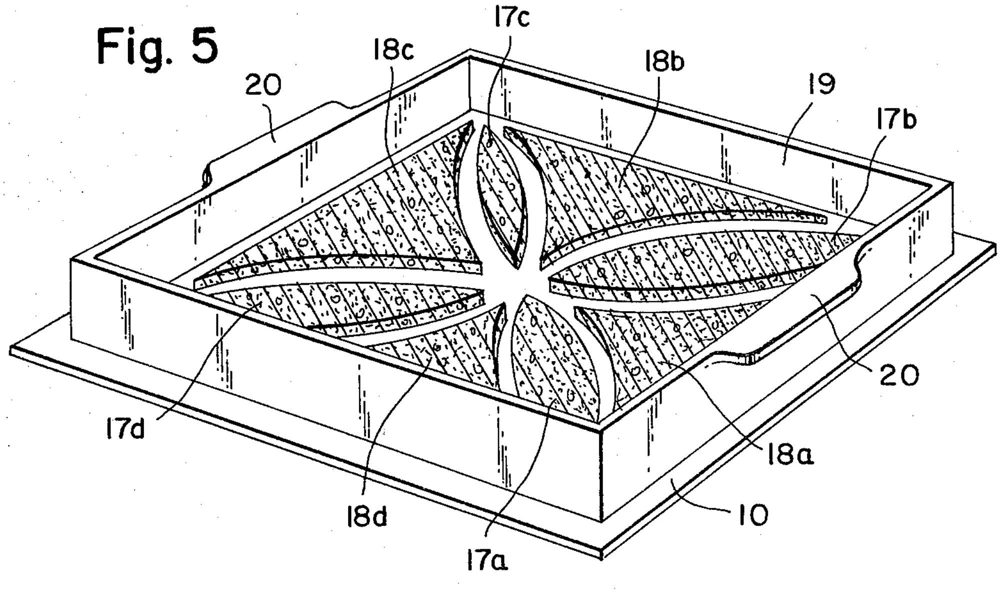
FIG. 5 is a perspective view showing the second form placed atop the planar support and surrounding the hardened concrete inlay pattern in a further step of the process.
Figure 6:
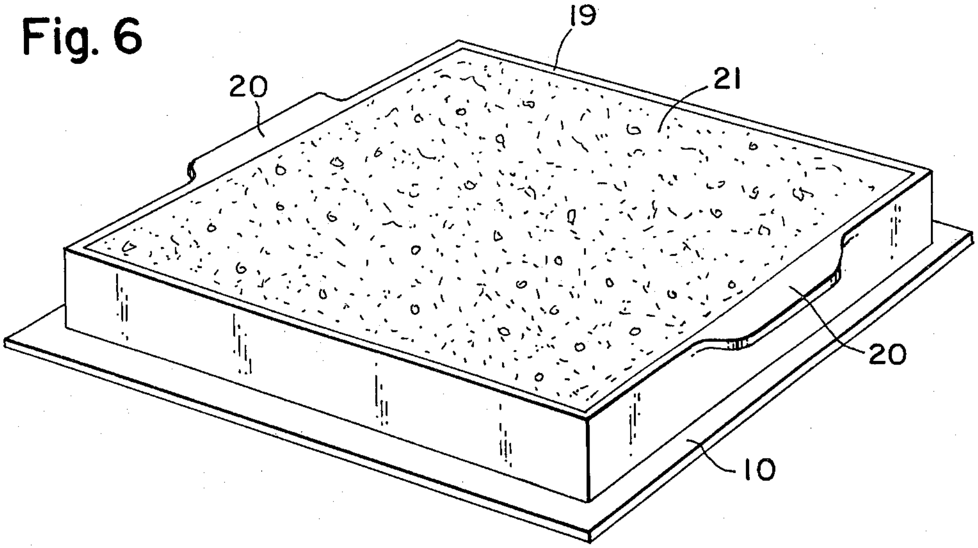
FIG. 6 is a perspective view comparable to that of FIG. 5, showing the second form completely filled with a second charge of wet concrete.
Figure 7:
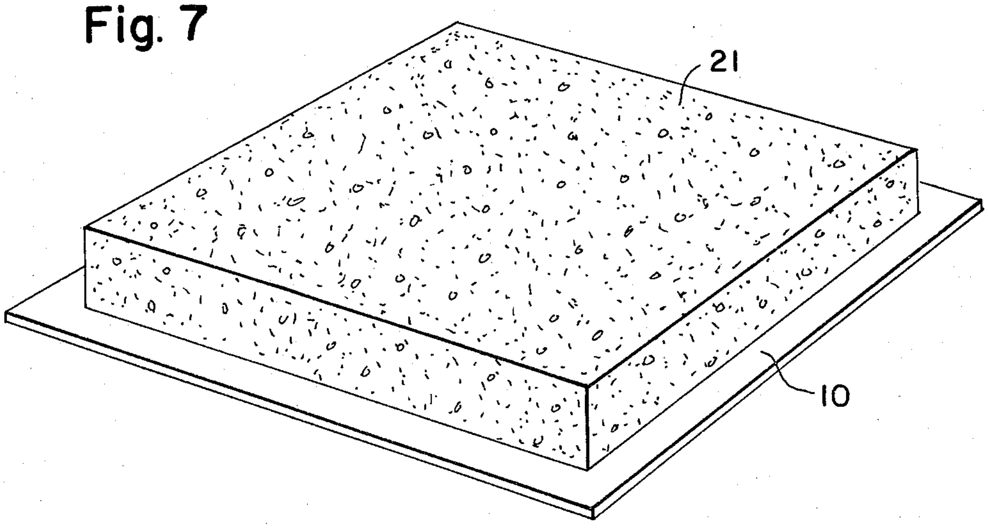
FIG. 7 is a perspective view comparable to that of FIG. 6, but with the second form removed.
Figure 8:
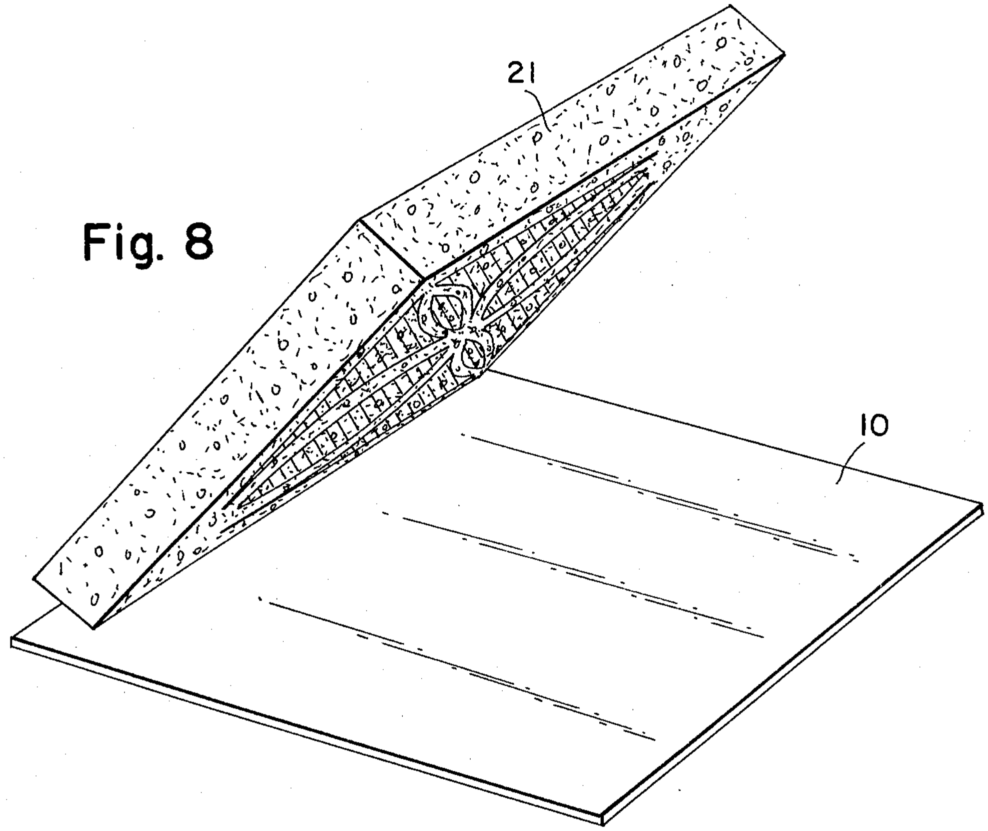
FIG. 8 is a perspective view comparable to that of FIG. 7, showing the concrete block being removed from the planar support.
Figure 9:
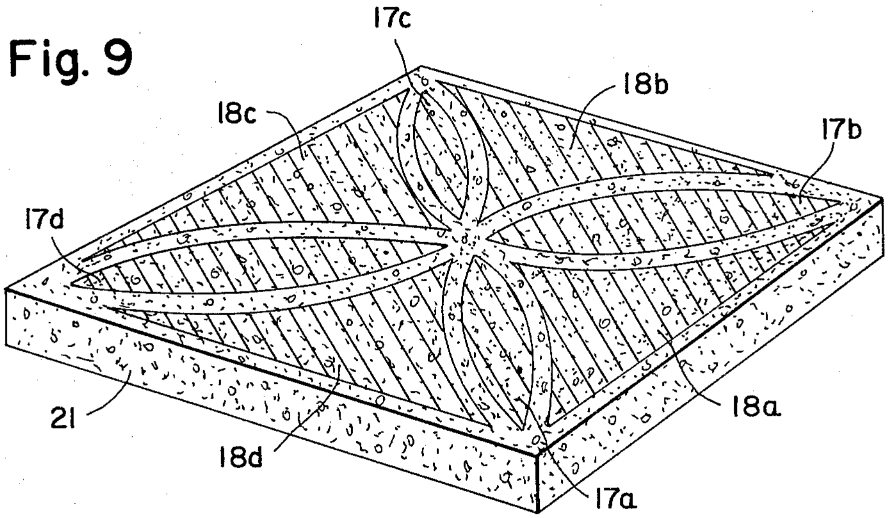
FIG. 9 is a top and side perspective view of a decorative block with an inlay made in accordance with the process of the invention.

Thereafter, a square-shaped hollow second form 19 having two handles 20 (FIG. 4) is placed on support 10 (FIG. 5) such that it surrounds the eight colored concrete sections 17*a*, 17*b*, 17*c*, 17*d* and 18*a*, 18*b*, 18*c* and 18*d*. This is preferably done after approximately twelve to twenty four hours curing of the first charge. Next, as shown in FIG. 6, a second charge of relatively wet concrete (which preferably is not colored or is colored differently from the first charge of concrete) is poured into the second form 19 completely filling the inner cavity thereof, while also covering the eight colored concrete segments, 17*a*, 17*b*, 17*c*, 17*d* and 18*a*, 18*b*, 18*c* and 18*d* and the spaces therebetween, thereby providing a background concrete segment 21. Finally, after concrete segment 21 is allowed to harden, also with approximately twelve to twenty four hours curing, the thus formed concrete block is lifted off support 10 (see FIG. 8). When the block is turned over (FIG. 9), the decorative inlaid pattern formed by the eight colored segments may be readily seen because the background concrete provides a grouting effect. Even though the second charge is substantially wetter than the first charge, it should be noted that the second charge can also be made sufficiently dry to be self supporting whereby form 19 can be removed before complete curing.

As a result of the fact that the inlaid face of the block was made against the planar support, there are no elevations or depressions in the inlaid surface of the block. As a result of the different degrees of wetness of the charges, the first charge has a relatively rough surface permitting an excellent bond between charges which is enhanced by a leaching of the second charge into the hidden surface of the first charge. Moreover, the top surface of the first charge can be roughened as later explained to further enhance adherence. Tests have shown that such a good adherence is obtained that, upon deliberate fracture of specimens, breakage occurs other than along the bond interface.

With further reference to the compositions of the charges, while a wide range of particle sizes are suitable, in actual practice it has been found desirable to make the concrete with gravel having a grit or grain size of about ⅛". A 4:1 aggregate to cement ratio has been found suitable.

It should be pointed out that it is desirable to place the planar support 10 on a drying rack following removal of the second form so as to permit the complete hardening of the first and second charges of concrete prior to further processing. It is also preferred that, after pouring of the first charge of concrete, into the first form 11, its upper exposed surface be troweled to effect roughening thereof. This will facilitate, as noted above, bonding thereof to the background layer produced by the second charge of relatively wet concrete.

In addition, it is preferable that the border 12 and inner segments 13 of form 11 be downwardly tapered so that the second charge of wet concrete may easily fill the spaces between the tile segments and create the same effect as grouting. It should also be understood that instead of coloring the inlay segments, a coloring agent could be added to the second charge of wet concrete so that the background surface of the block is colored rather than the inlaid pattern. Of course, differently colored coloring agents could be added to the respective charges to maintain a sharp contrast between the inlaid pattern surface and background surface of the block. It should also be noted that the contrasting appearances between the inlaid pattern surface and the background surface may be effected by other means as well. For instance, the set charges of concrete may be made of different grit or grain sizes of gravel to provide this contrast.

Figure 10A:
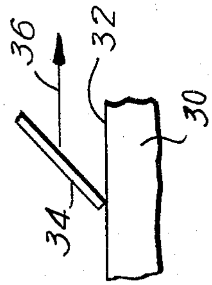
FIGS. 10(*a*)-(*c*) diagrammatically illustrate edge trowelling employed in the invention.
Figure 10B:
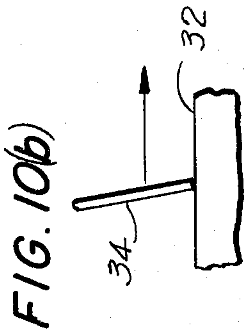
Figure 10C:
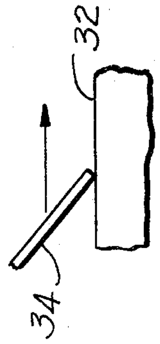

In the foregoing discussion of the method of the invention, reference has been made to roughening the upper surface of the first charge of concrete. This is effected according to the invention by means of edge trowelling. Forms of edge trowelling are illustrated in FIGS. 10(*a*)–(*c*). In FIG. 10(*a*) is seen a charge of concrete 30 having an upper surface 32. A trowel is shown resting edgewise on the upper surface, the trowel being indicated at 34. It is manually propelled in the direction illustrated by arrow 36. This type of trowelling provides for a smoothing of the upper surface 32. Contrary thereto, and as is employed in accordance with the invention, are the techniques illustrated in FIGS. 10(*b*) and 10(*c*). Therein the trowel 34 is shown respectively in perpendicular attitude relative to surface 32, or in reverse angular attitude relative to the angular attitude shown in FIG. 10(*a*). Both of the edgewise postures illustrated in FIGS. 10(*b*) and 10(*c*) will result in a roughening of the upper surface 32 to provide the degree of roughening enabling the second charge to adhere firmly thereto in accordance with the other aspects of the invention.

Figure 11:
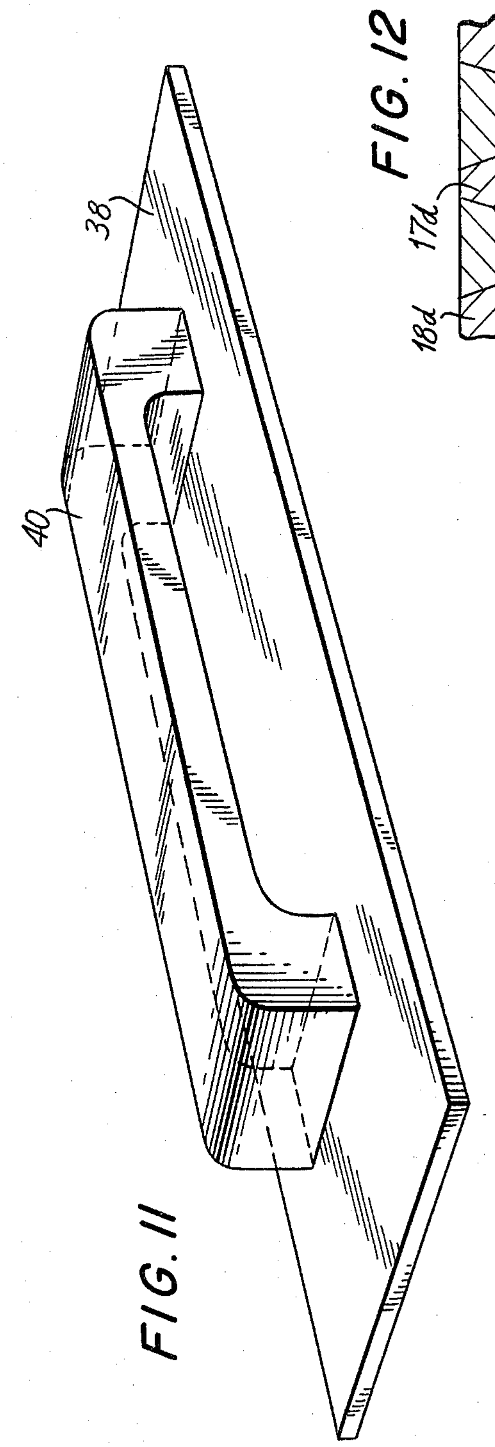
FIG. 11 is a perspective view of a trowel employed in the invention.

FIG. 11 illustrates a trowel employed in accordance with the invention, the trowel consisting of a flat plate 38 and a handle 40 attached thereto, such as by cementing or mechanical fasteners. By way of example, the flat plate 38 may have a thickness of one-eighth of an inch and may have a rectangular dimension of six inches by twenty-four inches. The trowel is wide so that it can cover all or substantially all of the form 11 for a trowelling operation in which the excess first charge is forced down into the form 11. At the same time in order to enable application of the force required for compacting the first charge, the handle 40 is sufficiently long as to enable grasping the same with both of the hands of the operator.

Figure 12:
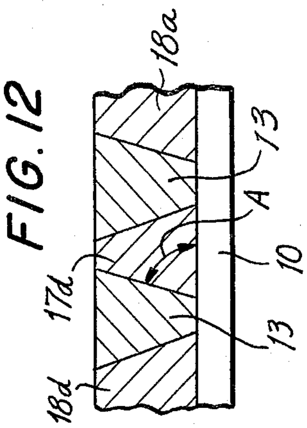
FIG. 12 diagrammatically illustrates in cross-section the tapered form of the form elements.

FIG. 12 illustrates that the portions 13 of the form 11 are formed with a tapered cross-section as has been discussed hereinabove. This enables ready withdrawal of the form 11 away from the plate or support 10, leaving in position the previously compacted concrete portions formed of the first charge. The tapered profiles of the elements 13 enable a ready compacting of the first charge by the trowelling operation indicated hereinabove. The angle of the profile is indicated by way of example, at A which angle may be for example, in the range of 75° plus or minus 15°.

From what has been stated hereinabove it will now appear that there is provided in accordance with the invention a method of making a concrete block with decorative inlays. This method comprises making first and second charges of concrete with different degrees of wetness with the second charge being substantially wetter than the first charge. A first form which is configured to define an inlay pattern is placed on a support and is filled with the first charge of concrete which is compacted so that it forms a relatively rigid self-standing concrete pattern corresponding to the configuration of the first form. This first form can be removed without delay leaving the relatively rigid self-standing concrete pattern on the support. Thereafter, a second form configured and dimensioned to encompass the concrete pattern is placed on the support to surround the concrete pattern. The second form is filled with the second charge of concrete until at least the lateral edges of the concrete pattern are surrounded by the second charge and such that the second charge of concrete bonds to the concrete pattern and forms therewith a concrete block. The adhesion between the two concrete charges is enhanced by the roughness of the first drier charge of concrete as well as a leaching of the second charge into the first charge. Further enhancement of the roughness may be accomplished by the edge trowelling discussed hereinabove.

While only one embodiment of the invention has been shown and described and pointed out, it will be understood that various omissions, substitutions and changes in the form and details of the method illustrated may be made by those skilled in the art without departing from the spirit of the invention. It is the intention, therefore, to be limited only as indicated by the scope of the claims appended hereto.

What is claimed is:

1. A method of making a concrete block with a decorative inlay comprising:
   - making first and second charges of concrete with different degrees of wetness with the second charge being substantially wetter than the first charge and having about fifty to one hundred percent more water than said first charge;
   - placing a first form configured to define an inlay pattern on a support;
   - filling said first form with said first charge of concrete, compacting said first charge of concrete and allowing said first charge to harden with only partial curing so that said first charge forms a relatively rigid, self-standing concrete pattern corresponding to the configuration of said first form;
   - removing said first form from said support leaving the relatively rigid, self-standing concrete pattern thereon;
   - placing a second form, which is configured and dimensioned to encompass said concrete pattern, on said support such that it surrounds said concrete pattern;
   - filling said second form with the second charge of concrete until at least the lateral edges of said concrete pattern are surrounded by said second charge of concrete whereby said second charge of concrete bonds to said concrete pattern and forms therewith a concrete block, the relatively rigid self-standing configuration of said first charge remaining intact upon addition of said second charge, the greater degree of wetness of said second charge of concrete permitting leaching of said second charge into said first charge to promote the bonding therebetween; and
   - curing at least the second charge of concrete.

2. A method as claimed in claim 1, wherein said charges of concrete are formed with about 4:1 aggregate to cement ratio.

3. A method as claimed in claim 1, wherein said first charge of concrete is made with an amount of water to permit limited adhesion to said support to avoid disorientation while also permitting compacting of the same into self-standing pattern prior to curing thereof.

4. A method as claimed in claim 1, wherein said first charge of wet concrete has an upper exposed surface, said method additionally including the step of following the step of filling said first form with said first charge of wet concrete, by subjecting said upper exposed surface of said first charge of wet concrete to a surface treatment to roughen said surface to promote bonding thereof to said second charge of wet concrete.

5. A method as claimed in claim 4, wherein said surface treatment is effected by edge trowelling said upper surface.

6. A method as claimed in claim 1, wherein said first form is constructed of tapered walls to permit ready withdrawal of the same and formation of a tapered concrete inlay.

7. A method as claimed in claim 1, wherein the compacting is effected by filling said first form with an excess of said first charge of concrete and trowelling the excess into the first form.

8. A method as claimed in claim 1, comprising curing the first charge of concrete after the first form is removed.

9. A method as claimed in claim 1 wherein the first charge is present in an amount of five to twenty percent excess volume with respect to the volume of said first form.

* * * * *